United States Patent
Di Serio

[11] Patent Number: 5,941,651
[45] Date of Patent: Aug. 24, 1999

[54] PROCESS FOR THE FABRICATION OF PARTS MADE OF CAST ALLOYS WITH REINFORCEMENT ZONES

[76] Inventor: Thomas Di Serio, Route Du Coin, 42400 St. Chamond, France

[21] Appl. No.: 08/743,323

[22] Filed: Nov. 4, 1996

Related U.S. Application Data

[63] Continuation of application No. 08/258,554, Jun. 10, 1994, abandoned.

[51] Int. Cl.$^6$ .................................................. B21D 39/00
[52] U.S. Cl. .............................. 403/279; 29/445; 29/520; 29/527.5; 29/888.092
[58] Field of Search ........................... 29/897.2, 888.09, 29/888.092, 897, 515, 788, 796, 527.5, 445, 520; 403/279, 281, 274

[56] References Cited

U.S. PATENT DOCUMENTS

| | | | |
|---|---|---|---|
| 1,904,698 | 4/1933 | Simons | 29/520 |
| 2,644,350 | 7/1953 | Regimbald | 29/520 X |
| 2,944,326 | 7/1960 | Stadhaus et al. | |
| 3,334,406 | 8/1967 | Bennett | 29/520 X |
| 3,339,270 | 9/1967 | Walton et al. | 29/520 X |
| 3,443,617 | 5/1969 | Whiteside et al. | |
| 3,762,881 | 10/1973 | Dunn | 29/445 X |
| 4,145,798 | 3/1979 | Sarnes | |
| 4,370,793 | 2/1983 | Kanamaru et al. | 29/520 X |
| 4,627,149 | 12/1986 | Colas | 29/520 X |
| 4,908,923 | 3/1990 | Anderson et al. | 29/527.5 |

FOREIGN PATENT DOCUMENTS

| | | |
|---|---|---|
| 1752515 | 6/1971 | Germany. |
| 2244945 | 3/1974 | Germany. |
| 59-141341 | 8/1984 | Japan. |

*Primary Examiner*—Joseph M. Gorski
*Attorney, Agent, or Firm*—Harness, Dickey & Pierce, P.L.C.

[57] ABSTRACT

The process is remarkable in that after the slug of the part to be obtained has been made, one or more inserts are provided which can be centered and introduced into the opening or openings, (1.1) and/or the recess or recesses, and/or the blind hole or holes (1.2) formed ahead of time on the slug, these inserts being prepositioned on a working die (3), and by the fact that this is followed by a stamping operation using a punch (5) or similar device permitting the final shaping of the part to be obtained and deformation of the material to permit the fixed and permanent integration by crimping of the insert or inserts (2), so as to create local reinforcement zones in terms of the needs and applications and uses of the part thus obtained.

15 Claims, 2 Drawing Sheets

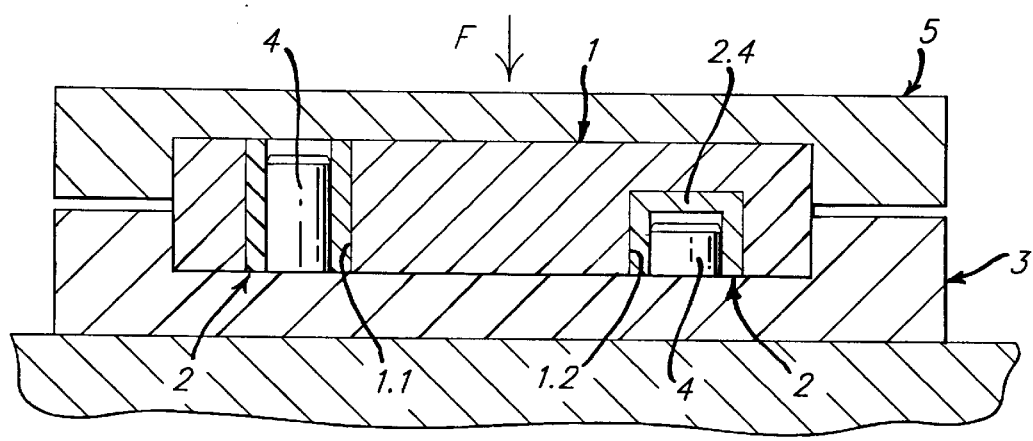
FIG. 4.
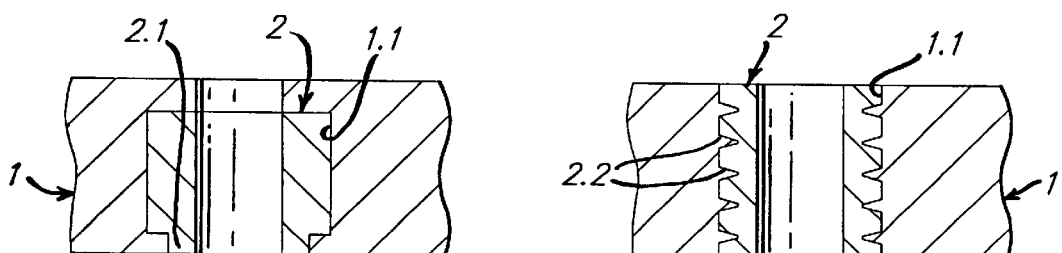
FIG. 5.　　FIG. 6.
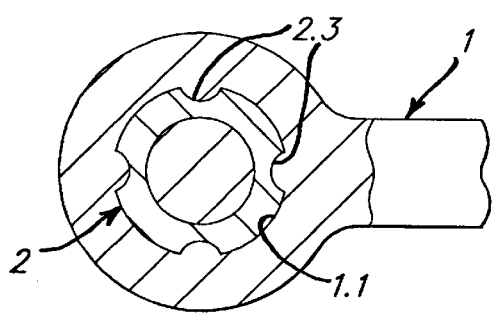　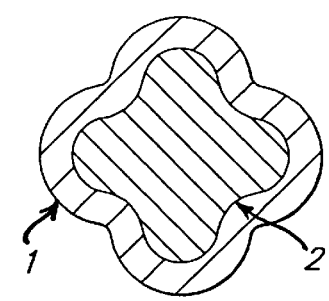
FIG. 7.　　FIG. 8.

PROCESS FOR THE FABRICATION OF PARTS MADE OF CAST ALLOYS WITH REINFORCEMENT ZONES

This is a continuation of U.S. patent application Ser. No. 08/258,554, filed Jun. 10, 1994 and now abandoned.

The invention is part of the technical sector of fabrication of parts made of cast alloys, and specifically aluminum, copper or other alloys, obtained by foundry casting, forging and similar processes.

Foundry and forging techniques make it possible to produce multiple parts for various uses. The founding of cast alloys such as aluminum has the particular advantage of producing light parts while complying with hardness parameters and criteria in terms of the applications considered. These parts can be, for example, connecting rods for cars, handles and cranks for bicycle parts.

These parts have zones where they are connected to other elements or devices such as pins or the like and are therefore equipped with openings.

Depending on the stresses on the parts in question, it may be necessary to consider reinforcement of the connecting and linking zones to prevent any deformation of the material when efforts are transmitted. Depending on the method, as in foundry casting, inserts of metal or other materials made, for example, in the form of rings, are used by introducing them into the above-cited openings in the workpiece. In order to ensure their resistance and attachment, the alloy such as aluminum is poured and, when cooled, keeps the insert in place. This insert may have striations on its outside periphery or grooves for anchoring the material in order to stabilize the position of the insert in the workpiece.

This process is in widespread use but has a number of drawbacks or limitations.

Use of the process is essentially limited to the installation on the workpiece of a single insert. In point of fact, the alloy casting operation and, specifically, hot aluminum casting results in dimensional variations in the substance and it is almost impossible to control with any great precision the spacing between the positions of several inserts.

Moreover, these inserts must be of a material that is compatible with the temperature of the cast alloys and, in particular, of aluminum.

These major drawbacks thus prevent the making and utilization of a number of inserts on parts obtained in the casting of aluminum and other alloys such as, for example, connecting rods for automobiles which are connected at each end in order to work together with the crankshafts and pistons of the engine block.

It is clear that these drawbacks are found in other applications of the same type.

The purpose of the invention was to provide a remedy for these drawbacks.

The applicant has, moreover, developed a process for manufacturing aluminum parts by casting, as specifically described in European patent no. 119365. This process consists in making foundry slugs preforms which are then subjected to an additional cold or low-temperature pressing, these slugs being arranged in die nests whose dimensions are clearly inferior to or smaller than those of the casting.

Within the context of its additional research, and in the light of the problem originally posed, the applicant has developed a special insert installation process for parts obtained by founding cast alloys, specifically aluminum alloys. This process is simple, quick to implement and permits the simultaneous introduction of one or more inserts in the same workpiece, thus avoiding the disadvantages encountered by the former method.

According to a first characteristic of the invention, the process consists in the fact that after making the slug or preform of the part to be obtained, one or more inserts are laid out which can be centered and introduced into the opening or openings, and/or the recess or recesses, and/or the blind hole or holes formed in advance on the slug, said inserts being propositioned on a working die, and in the fact that this is followed by a stamping operation using a punch or similar device that will permit the final shaping of the part to be obtained and deformation of the material for purposes of the fixed and permanent integration by crimping of the insert or inserts to define local reinforcement zones in terms of the needs and applications and uses of the part thus obtained.

These characteristics and others will become clear from the description that follows.

To fix the purpose of the invention illustrated in a manner not limited to the figures of the drawings in which:

FIG. 4 is a view according to FIG. 3 illustrating the part following the stamping operation inside the die-punch assembly.

FIG. 5 is a partial view illustrating a form of insert integrated into the finished part obtained following use of the process per the invention.

FIG. 6 is a partial view of a variation illustrating another form of insert.

FIG. 7 is a top view and cross-section of another form of insert with grooves on the outer periphery in its longitudinal plane.

FIG. 8 is a variant view of another profile of the insert.

Figure 1:
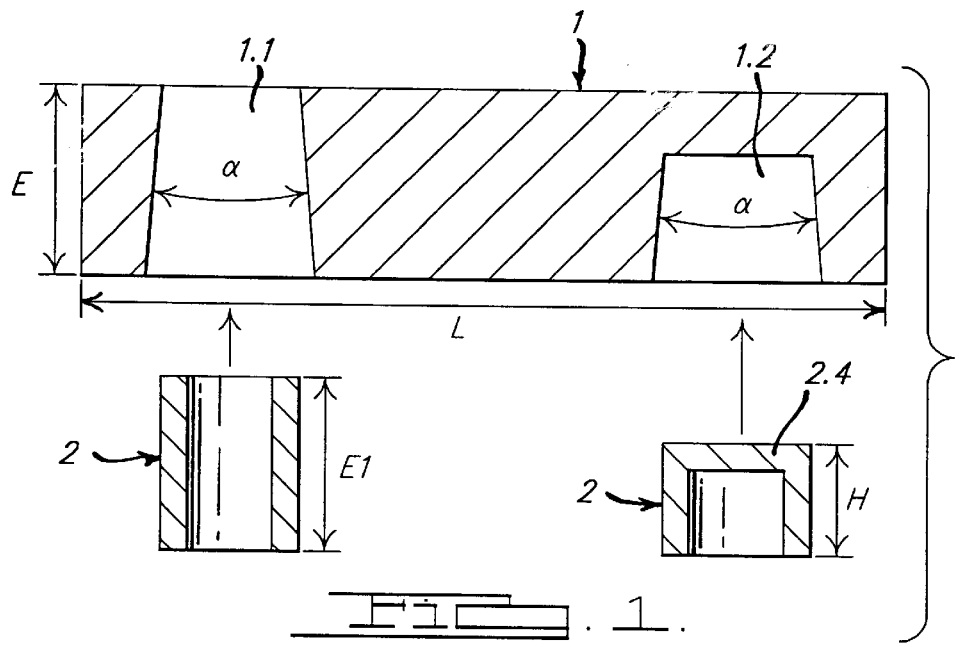
FIG. 1 is a schematic front view showing the components involved in the process prior to the stamping operation.

In order to make more specific the purpose of the invention, it will now be described in a non-limiting manner, illustrated in the drawing figures.

The process according to the invention, consists in fabricating pieces prepared in the foundry using cast alloys, and specifically aluminum, in all appropriate forms and sections in terms of the applications, by making slugs referred to overall as (1).

A slug is shown in FIG. 1, and includes, for example, an opening (1.1) leading to a blind hole (1.2). It is clear that this slug can have a number of openings and/or a number of blind holes. The profile and dimensions of the openings and/or blind holes are established by any appropriate method in terms of the needs and criteria of application of the rough-machined parts. Obviously, the slug can also have any necessary shape and profile on one of its faces.

Thus, the slug has a pre-set length (L) and a pre-set thickness (E).

The openings and/or holes and/or recesses have advantageously, an internal profile that is appreciably tapered several degrees according to an angulation (α) that will permit prepositioning of the slug and the receiving of one or several inserts (2) of complementary profile arranged and presented ahead of time on a work-receiving die (3). This die is made in any appropriate manner and profile in terms of the forms of slug machined.

This die is therefore equipped directly or by means of an add-on part with one or more fingers (4) for centering and receiving the inserts (2). The latter are mounted with a loose fit or floating around said finger or fingers (4). As a variant, the die may be directly formed so as to permit the centering and positioning of the inserts (2).

The inserts are positioned on the fingers or directly on the die manually by the operator, or also as part of an automated fabrication operation with manipulators and any appropriate means for transferring them from a distributor feeder or similar device.

Figure 3:
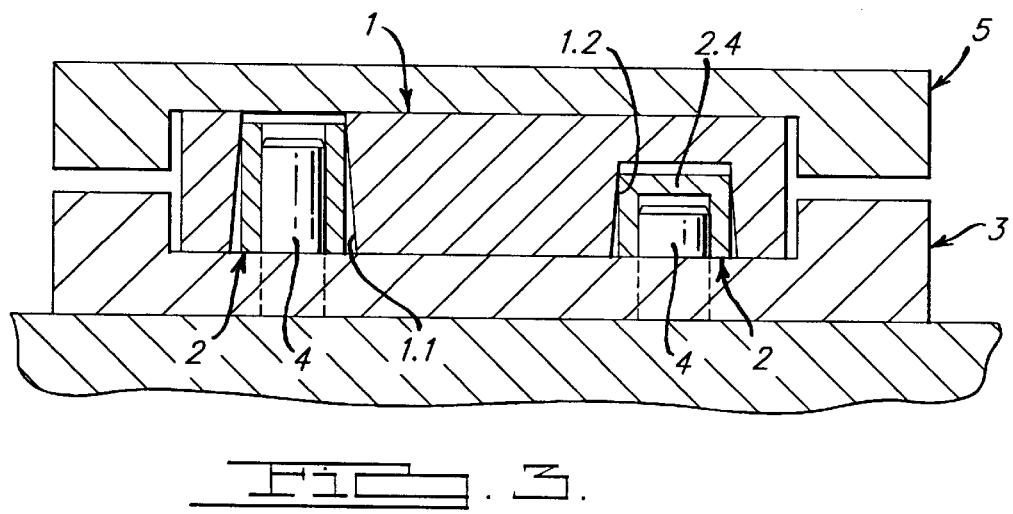
FIG. 3 is a view illustrating the positioning of the slug of the part in the forming die prior to the pressing operation.

FIG. 3 shows the positioning of the slug in the die. The slug is adjusted by the opening or openings and the blind hole or holes with a loose fit. The slug is centered in a recess made on the working die and its dimensions are appreciably smaller than the internal contour of the die itself.

The process according to the invention consists therefore in performing a stamping operation on the slug using a punch (5) or other similar device, exerting this force per the arrow F arranged axially in the same plane as the insert installation plane. At the time of this stamping operation corresponding to FIG. 4, the slug of the treated part is thus deformed and the material surrounds these inserts and they are crimped to ensure that they are permanently attached. The finished part then has a dimension (L) appreciably greater than the dimension (L) of the slug. Thus, the interior recess of the initially receiving die is completely filled by the finished part.

Figure 2:
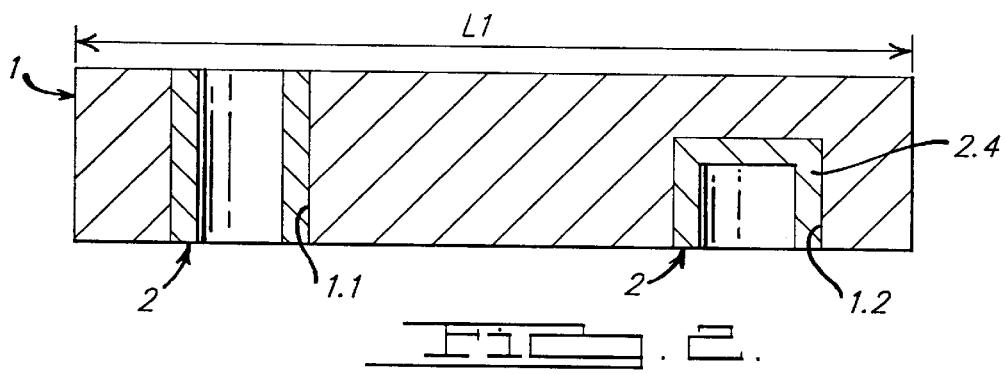
FIG. 2 is a view according to FIG. 1 of the part obtained following the stamping operation.

With reference to FIG. 2, the part obtained includes the inserts in the above-cited opening or openings and/or the blind hole or holes, and/or the recesses (not shown).

With reference to FIG. 5, the insert can be made in the form of a ring with a flange (2.1). In this form of embodiment, the height (H) of the ring is appreciably less than the thickness (E) of the finished part; thus the ring is retained by the material both in the area of the flange, as well as at the bottom. If the insert goes into a blind hole, said insert has a bottom face (2.4).

With reference to FIGS. 6 and 7, the ring can have circular striations (2.2) all around its outside periphery over all or part of its height. The ring may also have one or more longitudinal grooves (3) on all or part of its periphery. These striations and grooves thus represent means for anchoring the slug material resulting from the deformation of the slug during the stamping operation.

With reference to FIG. 8, this shows another form of the insert, not limiting in nature, which can be in herringbone or any other shape.

Without departing from the framework of the invention, the shape of the insert or inserts is unlimited and inserts of different shapes can be arranged on each part to be obtained.

The insert or inserts may be made of any metal, composite or other materials.

When the stamping operation has been completed, the punch is raised by an appropriate means and the finished part is ejected so as to move on to a new operating cycle.

The advantages of the invention are clear. Note particularly a new ability to arrange very easily and rapidly one or more inserts into any foundry slug in order to integrate them. It is therefore possible to lay out easily on the slug and on the part to be obtained various local reinforcement areas, depending on the needs and applications of the different stresses on the part. To do this, it suffices to provide, at the time the slug is made, for one or more openings and/or recesses and/or blind holes in any appropriate shapes that will make it possible to install inserts of complementary profile during a single stamping operation. This process is fully adaptable to automated production systems.

I claim:

1. A process for fabricating a part comprising the steps of:
   providing a die including an upper punch portion and a lower portion having a recess defined by a bottom surface and upwardly extending sidewalls, said lower portion and said upper punch portion being relatively movable along a first direction between an open position and a closed position, said recess and said upper portion together defining a surface contour of a finished part when in said closed position;
   casting an alloy into a preform, said preform having a shape roughly approximating said surface contour but with a first dimension extending in said first direction greater than that of said surface contour and a second dimension extending generally perpendicular to said first direction less than that of said surface contour, said preform having an opening extending generally in said first direction from an outer surface of said preform from the bottom surface toward the top surface, said opening being defined by an inner wall,
   providing a reinforcement member having an outer wall;
   positioning said reinforcement member within said recess;
   placing said preform within said recess with said reinforcement member being received within said opening and such that said first dimension of said preform extends above said upwardly extending sidewalls of said lower portion of said die;
   moving said upper punch portion with respect to said lower portion toward said closed position and into engagement with said preform;
   applying a force to said die to move said upper punch portion and said lower portion into said closed position thereby subjecting said preform to a forming pressure that increases said second dimension of said preform while decreasing said first dimension so as to cause said shape of said preform to conform to said surface contour defined by said recess and said upper portion and inwardly deforming said inner wall of said opening into secure engagement with said outer wall of said reinforcement member whereby said reinforcement member reinforces said preform and thereafter;
   removing said preform having said surface contour and said reinforcement member from said recess as a unit.

2. A process for fabricating a part as set forth in claim 1 wherein said positioning step includes positioning said reinforcement member directly on said bottom surface of said recess.

3. A process for fabricating a part as set forth in claim 1 further including the step of providing a centering finger extending upwardly from said bottom surface of said recess, said reinforcement member has an opening therein and wherein said positioning step includes receiving said centering finger within said opening of said reinforcement member.

4. A process for fabricating a part as set forth in claim 1 wherein said reinforcement member is in the form of annulus and said outer wall has an indent adjacent one end thereof and wherein said force applying step causes said inner wall of said opening to flow into said indent as said first dimension is decreased and said second dimension is increased, said annulus having a height less than the value to which said first dimension is decreased.

5. A process for fabricating a part as set forth in claim 1 wherein said inner wall defines a conically shaped opening tapering inwardly from said outer surface.

6. A process for fabricating a part as set forth in claim 1 wherein said preform is provided with a plurality of openings, a reinforcement member is provided for each of said openings, each of said reinforcement members are positioned within said recess, said preform is placed within said recess with respective ones of said reinforcement members being received within respective ones of said plurality of openings, said force applying step being operative to fix each of said reinforcement members within respective ones of said plurality of openings whereby said inserts are accurately positioned with respect to each other and with respect to said preform having said surface contour.

7. A process for fabricating a part as set forth in claim 1 wherein said reinforcement member has a height less than that of said surface contour of said recess in said first direction.

8. A process for fabricating a part as set forth in claim 1 wherein said first dimension of said preform is decreased to a minimum at least equal to the height of said reinforcement member.

9. A process for fabricating a part as set forth in claim 1 wherein said preform is at a temperature between cold and warm during said force applying step.

10. A process for fabricating a part as set forth in claim 1 wherein said reinforcement member includes an end and wherein said force applying step deforms said inner wall of said opening into secure engagement with said outer wall of said reinforcement member without flowing material of said preform over said outer end of said insert.

11. Parts obtained by the process recited in claim 1 and including two or more openings provided in said preform and two or more reinforcement members introduced and formed into respective of said openings by stamping wherein said reinforcement members are accurately and precisely positioned with respect to said preform having said surface contour and with respect to each other within said part whereby said reinforcement members are more uniformly positioned.

12. Parts obtained by the process recited in claim 2 and including one or more openings in said preform and one reinforcement member introduced and formed into each said opening by stamping wherein said reinforcement member is accurately and precisely positioned within said part whereby said reinforcement members are more uniformly positioned.

13. Parts obtained by the process recited in claim 3 and including one or more openings in said preform and one reinforcement member introduced and formed into each said opening by stamping wherein said reinforcement member is accurately and precisely positioned within said part whereby said reinforcement members are more uniformly positioned.

14. Parts obtained by the process recited in claim 4 and including one or more openings in said preform and one reinforcement member introduced and formed into each said opening by stamping wherein said reinforcement member is accurately and precisely positioned within said part whereby said reinforcement members are more uniformly positioned.

15. Parts obtained by the process recited in claim 5 and including one or more openings in said preform and one reinforcement member introduced and formed into each said opening by stamping wherein said reinforcement member is accurately and precisely positioned within said part whereby said reinforcement members are more uniformly positioned.

* * * * *

UNITED STATES PATENT AND TRADEMARK OFFICE
CERTIFICATE OF CORRECTION

PATENT NO. : 5,941,651
DATED : August 24, 1999
INVENTOR(S) : Thomas Di Serio

It is certified that error appears in the above-indentified patent and that said Letters Patent is hereby corrected as shown below:

Column 1, line 56, after "slugs," insert --or--.

Column 2, line 7, "propositioned" should be --prepositioned--.

Signed and Sealed this

Twenty-fifth Day of January, 2000

Attest:

Attesting Officer

Acting Commissioner of Patents and Trademarks